United States Patent Office 3,250,765
Patented May 10, 1966

3,250,765
9β,19-CYCLO STEROIDS OF THE PREGNANE
AND ANDROSTANE SERIES
Oskar Jeger and Kurt Schaffner, Zurich, Switzerland, assignors to Ciba Corporation, New York, N.Y., a corporation of Delaware
No Drawing. Filed Oct. 1, 1962, Ser. No. 227,594
Claims priority, application Switzerland, Oct. 3, 1961, 11,475/61
27 Claims. (Cl. 260—239.55)

This invention relates to 9β:19-cyclosteroids and to a process for the preparation thereof. These compounds, in particular 9β:19-cyclosteroids of the pregnane series and androstane series, are pharmacologically effective and are also advantageous intermediate products for the manufacture of other biologically active steroids. Thus, 3:20-dioxo-9β:19-cyclopregnane compounds and their substiution products have an effect on the mineral metabolism in that they have a sodium-eliminating action. 21-unsubstituted pregnane derivatives, such as, for example, $\Delta^4$-3:11:20-trioxo-9β:19-cyclopregnene, moreover have a progestational effect. $\Delta^4$-3-oxo-9β:19-cycloandrostenes which are oxygenated in 17-position and also the corresponding saturated compounds are of interest in particular as anabolics. 3:20-dioxo-9β:19-cyclopregnane derivatives which are hydroxylated at the 21 and/or the 17 carbon atom are also anti- inflammatory and effective as anti-shock agents.

The 9β:19-cyclo structure has heretofore been found in nature only in the triterpene series. Thus, for example, in the case of the pentacyclic cycloartenol, it is a question of $\Delta^{24}$-9β:19-cyclolanostene. Access to these products by synthetic methods, however, is unkown.

It has now been found that 9β:19-cyclosteroids can be obtained by esterifying 19-hydroxysteroids having an oxo group in 11-position or a double bond in 9(11)-position with a sulfonic acid, treating the esters obtained with basic agents and, if desired, removing the 11-oxo group or hydrogenating the 11:12-double bond, in a manner known per se, in the 11-oxo- or $\Delta^{11(12)}$-9β:19-cyclo compounds formed and, if required, forming a $\Delta^4$-3-oxo group in the ring A.

To convert the 19-hydroxysteroids used as starting materials into the corresponding 19-sulfonic acid esters, aliphatic, for example lower aliphatic sulfonic acids are employed in particular such as, for instance, methanesulfonic acid, ethanesulfonic or monocyclic aromatic sulfonic acids, such as, for example, p-toluenesulfonic acid, p-bromobenzene-sulfonic acid, etc., preferably in the form of their functional derivatives, such as, for instance, their halides, especially the chlorides. The reaction with these agents is carried out in a suitable organic solvent, preferably in the presence of an organic base such as pyridine.

To cyclize the sulfonic acid esters of the 19-hydroxy-steroids obtained according to this process so as to form the 9β:19-cyclosteroids, there are used as basic agents, for example, alkali metal and alkaline earth metal hydroxides, such as, for instance, sodium, potassium, barium or calcium hydroxide, alakali metal and alkaline earth metal carbonates, such as, for example, lithium carbonate, sodium carbonate, etc., and furthermore tertiary organic bases such as pyridine, trimethylamine, N-methylpiperidine, etc. Particularly suitable are alkali metal alcoholates of lower aliphatic alcohols, for example, those having 1 to 8 carbon atoms, such as, for example methanol, ethanol, tert. butanol, etc. The reaction is preferably carried out in organic solvents, such as lower aliphatic alcohols like those mentioned above and organic bases such as pyridine, if required, at elevated temperature.

Cyclization is effected particularly easily in the 19-sulfonic acid esters of $\Delta^{9,11}$-19-hydroxysteroids. This cyclization, for example, already occurs at room temperature under the influence of the bases, such as, for instance, pyridine, which may have been employed in the esterifiaction stage.

The 19-hydroxy-11-oxosteroids employed as starting materials may be prepared by the method described in copending application Ser. No. 211,103, filed July 19, 1962, by Oskar Jeger et al., now Patent No. 3,147,251. This consists in that 19-unsubstituted 11-oxosteroids are exposed to ultraviolet light and the 11-hydroxy-11:19-cyclosteroids formed are treated with lead tetraacetate, and in any resulting 11-oxo-19-acyloxy steroid the acyloxy group is hydrolyzed. Another method of access to the said starting materials starting from suitably substituted cardanolides occurring in nature is described in U.S. Patents Nos. 2,975,173 and 2,976,284. The $\Delta^{9(11)}$-19-hydroxy-steroids likewise employed as starting materials are preferably obtained from the above-mentioned 19-hydroxy-11-oxo compounds by reduction with complex metallic hydrides of aluminum or boron, for example lithium aluminum hydride, sodium boron hydride, lithium or sodium tritertiary butoxy aluminum hydride, followed by partial acetylation in 19-position, splitting off of the 11β-hydroxyl group with formation of the 9(11)-double bond and subsequent hydrolysis of the 19-esters.

Particularly suitable as starting materials for the present process are 11-oxo- or $\Delta^{9(11)}$-19-hydroxy-steroids of the androstane, pregnane, cholane, cholestane, spirostane, and cardanolide series, as well as triterpenes, for example, of the lanostane type. These may also have further substituents, for example in one or more of positions 1, 2, 3, 4, 5, 6, 7, 14, 15, 16, 17, 20, 21 and possibly also in the side chains, such as, for example, alkyl, for instance lower alkyl, groups such as methyl groups or unsaturated aliphatic hydrocarbon radicals such as, for instance, ethinyl groups, free or protected, i.e., esterified or etherified hydroxyl groups, free or functionally modified keto groups, such as, for instance, ketals, enamines, enol ethers, etc., and halogen atoms. Moreover, the compounds may also have one or more double bonds, for example in the ring D or in the side chain. Specific starting materials are: 3β-acetoxy-11:20-dioxo-19-hydroxypregnane, 3:20-diethylenedioxy-11-oxo-19-hydroxypregnane, $\Delta^4$-3:11:20-trioxo-19-hydroxypregnene, 3:17-diacetoxy-11-oxo-19-hydroxyandrostane, 3:17 - diethylenedioxy - 11-oxo-19-hydroxyandrostane, $\Delta^4$ - 3:11-dioxo-17-acyloxy-19-hydroxyandrostene, $\Delta^{24}$ - 3β-acetoxy-11-oxo-19-hydroxylanostene, 3 - ethylenedioxy-11-oxo-19-hydroxyspirostane and also $\Delta^{9(11)}$-3β-acetoxy-19-hydroxy-20-oxopregnene, $\Delta^{9(11)}$-3:20-diethylenedioxy-19-hydroxypregnene, $\Delta^{4,9(11)}$-3:20-dioxo-19 - hydroxypregnadiene, $\Delta^{9(11)}$ - 3:17β-diacetoxy-17α-methyl-19-hydroxyandrostene, $\Delta^{4,9(11)}$-3-oxo-17β-acetoxy-17α-methyl-19-hydroxyandrostadiene and $\Delta^{9(11),24}$-3β-acetoxy-19-hydroxylanostadiene.

The products obtained by this process are novel steroids with the following partial formulae

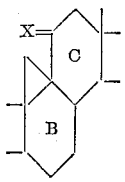 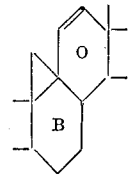

in which X signifies hydrogen atoms or a keto group. The first products of the process as obtained directly by cyclization are the 9β:19-cyclosteroids having a keto group in 11-position or a double bond in 11:12-position. The products which are unsubstituted in 11-position and saturated in the ring C can be obtained for example by reduction with hydrazine and alkali according to the Wolff-Kishner method from the 11-keto-9β:19-cyclosteroids or by catalytic hydrogenation, e.g., with palladium catalysts from the Δ11-9β:19-cyclosteroids. Specific products according to this process are, for example, 3-hydroxy-11:20-dioxo-9β:19-cyclopregnane, 3:20 - diethylenedioxyl-11-oxo-9β:19-cyclopregnane, Δ4-3:11:20-trioxo - 9β:19-cyclopregnene, Δ24-3-hydroxy-11-oxo - 9β:19 - cyclolanostene, Δ11-3-hydroxy-20-oxo - 9β:19 - cyclopregnene, Δ11-3:20-diethylenedioxy-9β:19-cyclopregnene, Δ11-3:17-dihydroxy-9β:19-cycloandrostene and their derivatives saturated in 11:12-position and functional derivatives of these compounds, such as esters, ethers, ketals, etc. In the esters, the acid radicals are preferably those of saturated and unsaturated aliphatic or cycloaliphatic carboxylic acids or of aromatic of heterocyclic carboxylic acids or acids of mixed type such as araliphatic acids, preferably having from 1 to 20 carbon atoms, particularly of trimethylacetic acid and also of acetic acid, propionic acid, butyric acids, valeric acids, such as n-valeric acid, caproic acids, such as β-trimethylpropionic acid, oenanthic, caprylic, pelargonic, capric, undecyl acids, for example undecylenic acid, lauric, myristic, palmitic or stearic acids, for example oleic acid, cyclopropyl-, cyclobutyl-, cyclopentyl- and cyclohexyl-carboxylic acid, cyclopropylmethylcarboxylic acid, cyclobutylmethylcarboxylic acid, cyclopentylethylcarboxylic acid, cyclohexylethylcarboxylic acid, cyclopentyl-, cyclohexyl- or phenylacetic acids or -propionic acids, benzoic acid, phenoxyalkane acids, such as phenoxyacetic acid, p-chlorophenoxyacetic acid, 2:4-dichlorophenoxyacetic acid, 4-tert. butylphenoxyacetic acid, 3-phenoxypropionic acid, 4-phenoxybutyric acid, furan-2-carboxylic acid, 5-tert. butyl-furan-2-carboxylic acid, 5-bromo-furan-2-carboxylic acid and nicotinic acids, or the acid radicals are those of β-keto-carboxylic acids, for example acetoacetic, propionylacetic, butyrylacetic or caprinoylacetic acid, of amino acids, such as diethylaminoacetic acid, aspartic acid, of dicarboxylic acids, for example oxalic, succinic, maleic, glutaric, dimethylglutaric, pimelic, acetodicarboxylic, acetylenedicarboxylic, phthalic, tetrahydrophthalic, hexahydrophthalic, endomethylenetetrahydrophthalic, endomethylenehexahydrophthalic, endoxyhexahydrophthalic, endoxytetrahydrophthalic acid, camphoric acid, cyclopropanedicarboxylic acid, cyclobutanedicarboxylic acid, diglycollic acid, ethylenebisglycollic acid, polyethylenebisglycollic acids, thioglycollic acid, furandicarboxylic, dihydrofurandicarboxylic and tetrahydrofurandicarboxylic acids, quinolic acid, cinchomeronic acid and of the polyethyleneglycolmonoalkylether semi-esters of the above dicarboxylic acids. Instead of carboxylic acid radicals, radicals of sulfonic acids and furthermore of phosphoric, sulfuric or hydrohalic acids may also be present.

The conversion of the 3-oxygenated products of this process which are saturated in 4:5-position into the corresponding Δ4-3-oxo-9β:19-cyclosteroids can be effected in a manner known per se by bromination of the 3-oxo compound followed by splitting off of hydrogen halide, preferably by heating with lithium halides in an N-dialkylamide, in particular dimethylformamide.

Particularly valuable products of the process are, e.g., those of the Formulae I and II

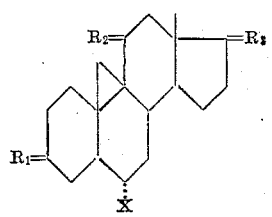

I

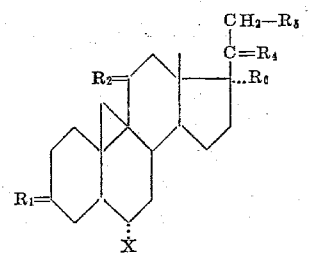

II wherein $R_1$ stands for oxo, lower alkenedioxy, hydrogen and hydroxy, or hydrogen and acyloxy, $R_2$ for hydrogen or oxo, $R_3$ for oxo, lower alkylenedioxy, hydrogen and β-positioned hydroxy or acyloxy or lower alkyl, alkenyl or alkinyl and β-positioned hydroxy or acyloxy, X for hydrogen, methyl, fluorine or chlorine, $R_4$ for oxo or lower alkylenedioxy, and $R_5$ and $R_6$ for hydrogen, hydroxy or acyloxy, and the dehydro compounds thereof which have a double bond extending from carbon atom 5 and/or in 11(12)-position. The acyloxy groups are derived, e.g., from the aforementioned acids, especially from carboxylic acids having 1–20 carbon atoms.

The active substance obtainable by this process can be employed as medicaments, for example in the form of mixtures of substances which contain the said active substance and a solid or liquid excipient. The mixtures of substances are prepared by methods known per se, for example using pharmaceutical, organic or inorganic carrier materials suitable for parenteral, enteral or local administration. Substances which can be used are substances which do not react with the new compounds, such as, for example, water, vegetable oils, benzyl alcohols, polyethylene glycols, gelatines, lactose, starch, magnesium stearate, talc, petroleum jelly, cholesterol or other carrier for medicaments. In particular, preparations for parenteral administration are made, preferably solutions, primarily aqueous or oily solutions, and also suspensions, emulsions or implants; for enteral application, tablets or dragees are also prepared, and for local application, moreover, ointments or creams. If required, it is possible to sterilise the preparations or add auxiliary substances, such as preserving, stabilizing, wetting or emulsifying agents, salts for regulating the osmotic pressure or buffers. They may also contain other therapeutically effective compounds. The preparation thereof is carried out in known manner.

The process is described in detail in the following illustrative examples. The temperatures are given in degrees centigrade.

Example 1

120 mg. of 3:20-diethylenedioxy-11-oxo-19-hydroxy-5α-pregnane are dissolved in 3 ml. of pyridine and 0.1 ml. of mesyl chloride is added. After the solution has been standing for 12 hours at room temperature, it is poured onto ice, extracted with ether and the organic phase is washed with sodium carbonate solution and water. After evaporation of the ether solution, which has been dried over anhydrous sodium sulfate, 100 mg. of crystals are obtained which, after being crystallized twice from acetone-petroleum ether, melt at 163° C. with decomposition. $[α]_D = +38.4°$ ($c=0.843$). IR spectrum: 1700, 1175, 1105, 1070, 1055, 1033 cm.$^{-1}$ (CHCl$_3$). The product is 3:20-diethylenedioxy-11-oxo-19-mesyloxy-5α-pregnane.

Example 2

70 mg. of 3:20-diethylenedioxy-11-oxo-19-mesyloxy-5α-pregnane are heated for 3 hours to 140° C. together with 100 mg. of sodium methylate in 10 ml. of absolute methanol in a bomb tube. The ether extract of the reaction solution is washed with water until neutral and dried over anhydrous sodium sulfate and, after evaporation in vacuo, yields 70 mg. of oily crystals. Filtration thereof in methylene chloride solution through neutral aluminum oxide (act. II) yields 40 mg. of crystals which, after being twice dissolved in acetone-petroleum ether and allowed to crystallize, give a constant melting point of 144° C. Absorption spectrum (ethanol): $\lambda_{max}$ 216 m$\mu$ ($\epsilon$=4400). Nuclear magnetic resonance spectrum (22 mg. in 0.4 ml. CCl$_4$): $\delta$=0.75 (doublet, J about 0.8 c.p.s.); 1.22 (singlet), 2.79 (doublet, J=15 c.p.s.) and 3.85 p.p.m. (singlet) The product obtained is 3:20-diethylenedioxy-11-oxo-9$\beta$:19-cyclo-5$\alpha$-pregnane

Example 3

1.85 grams of sodium are dissolved in 90 ml. of diethyleneglycol under heat and 60 ml. of anhydrous hydrazine and 475 mg. of 3:20-diethylenedioxy-11-oxo-9$\beta$:19-cyclo-5$\alpha$-pregnane are added at 20° C. to the solution. The mixture is first heated for 3 hours to 130° C. Hydrazine is then distilled off until the temperature of the mixture rises to 180° C. and the latter is then allowed to continue to react at this temperature overnight. Some hydrazine is thereupon distilled off once more and the mixture is heated to 210° C. for another 24 hours. The cooled reaction mixture is taken up in ether, washed with water until neutral and dried over anhydrous sodium sulfate. After evaporation of the solution, 430 mg. of crude 3:20-diethylenedioxy-9$\beta$:19-cyclo-5$\alpha$-pregnane are obtained.

Example 4

A solution of 80 mg. of 3:20-diethylenedioxy-11-oxo-19-hydroxy-5$\alpha$-pregnane in 5 ml. of absolute ether is added dropwise to 100 mg. of lithium aluminum hydride dissolved in 10 ml. of absolute ether and the reaction mixture is heated for 1½ hours at reflux temperature while stirring. The excess reducing agent in the cooled reaction mixture is destroyed by adding ethyl acetate and the mixture is thereupon extracted with ether. The organic phase, washed with water until neutral and dried over anhydrous sodium sulfate, yields 80 mg. of an oily crystalline mixture after evaporation in vacuo. When this mixture is crystallized twice from acetone-petroleum ether, crystals are obtained which have a constant melting point of 212° C. [$\alpha$]$_D$=+32° (c=0.704). IR spectrum (CHCl$_3$): bands at 3580 cm.$^{-1}$. The product obtained is 3:20-diethylenedioxy-11$\beta$:19-dihydroxy-5$\alpha$-pregnane.

Example 5

450 mg. of 3:20-diethylenedioxy-11$\beta$:19-dihydroxy-5$\alpha$-pregnane are dissolved in 8 ml. of acetic anhydride-pyridine mixture (1:1) and allowed to stand for 1½ hours at room temperature. The reaction mixture is thereupon taken up in ether and the solution is washed with water until neutral. The ethereal phase, dried over anhydrous sodium sulfate, yields after evaporation 500 mg. of crude product which is chromatographed on neutral aluminum oxide (activity II) 250 mg. of crystals of 3:20-diethylenedioxy-11$\beta$-hydroxy-19-acetoxy-5$\alpha$-pregnane can be eluted with benzene-ether mixture (4:1) and these, after being crystallized once from acetone-petroleum ether, have a constant melting point of 154° C. (175 mg.). [$\alpha$]$_D$=+56.2° (c=0.873). IR spectrum (CHCl$_3$): bands at 3500, 1725 and 1245 cm.$^{-1}$.

Example 6

2.5 grams of phosphorus oxychloride are added to a solution of 140 mg. of 3:20-diethylenedioxy-11$\beta$-hydroxy-19-acetoxy-5$\alpha$-pregnane in 5 ml. of pyridine and the mixture is heated for 2 hours to 70° C. The cooled mixture is thereupon poured onto ice and extracted with ether. The ether solution is washed with sodium hydrogen carbonate solution and water and dried over anhydrous sodium sulfate. After evaporation there are obtained 125 mg. of oily $\Delta^{9(11)}$-3:20-diethylenedioxy-19-acetoxy-5$\alpha$-pregnene which shows a yellow reaction with tetranitromethane and exhibits bands at 1720 and 1250 cm.$^{-1}$ in the IR spectrum (CHCl$_3$).

Example 7

120 mg. of oily and not further purified $\Delta^{9(11)}$-3:20-diethylenedioxy-19-acetoxy-5$\alpha$-pregnene are saponified for one hour at boiling heat in 10 ml. of 5% methanolic potassium hydroxide solution. After cooling, the mixture is extracted with ether and the organic phase is washed with water until neutral. The ether solution, dried over anhydrous sodium sulfate, yields after evaporation 80 mg. of crystals which are filtered in a benzene-ether solution (4:1) through neutral aluminum oxide (activity II) and, after being crystallized once from acetone-petroleum ether, have a constant melting point of 120° C. (58 mg.). [$\alpha$]$_D$=+35° (c=0.627). Nuclear magnetic resonance spectrum (37 mg. in CDCl$_3$): $\delta$=about 5.44 (wide signal), 3.92 (singlet), 3.66 (singlet), 1.30 (singlet) and 0.71 p.p.m. (singlet). The product obtained is $\Delta^{9(11)}$-3:20-diethylenedioxy-19-hydroxy-5$\alpha$-pregnene.

Example 8

0.15 ml. of mesyl chloride is added to a solution of 100 mg. of $\Delta^{9(11)}$-3:20-diethylenedioxy-19-hydroxy-5$\alpha$-pregnene in 5 ml. of pyridine at 0° C. and the mixture is thereupon allowed to stand for 5 minutes while cooling with ice and for 2½ hours at 20° C. The mixture is thereupon diluted with 20 ml. of ether and poured on to ice. After standing for some time at room temperature, extraction with ether is carried out and the organic phase is washed with dilute hydrochloric acid, sodium carbonate solution and water. The ether solution, dried over anhydrous sodium sulfate, gives after evaporation 110 mg. of residue which is recrystallized from ether-hexane and yields pure $\Delta^{11}$-3:20-diethylenedioxy-9$\beta$:19-cyclo-5$\alpha$-pregnene.

Example 9

Hydrogenation of 50 mg. of $\Delta^{11}$-3:20-diethylenedioxy-9$\beta$:19-cyclo-5$\alpha$-pregnene in 10 ml. of ethanol in the presence of 50 mg. of palladium carbon yields, after evaporation of the solution, from which the catalyst has been removed, and crystallization, 30 mg. of a preparation which is identical with 3:20-diethylenedioxy-9$\beta$:19-cyclo-5$\alpha$-pregnane.

By heating the product obtained with acetic acid of 67% strength for 15 minutes to 90° C., dilution with water, filtering off, washing the residue with water, drying and recrystallization from acetone-hexane, 3:20-dioxo-9$\beta$:19-cyclo-5$\alpha$-pregnane is obtained. A 4:5-double bond can be introduced into this compound in a manner known per se by bromination and dehydrobromination and in this way $\Delta^4$-3:20-dioxo-9$\beta$:19-cyclo-pregnene is obtained.

What is claimed is:

1. Process for the manufacture of 9$\beta$:19-cyclosteroids selected from the group consisting of androstanes, pregnanes, cholanes, cholestanes, spirostanes, cardanolides and lanostanes, which comprises esterifying a corresponding 19-hydroxysteroid having in 11-position a member selected from the group consisting of an oxo group and a $\Delta^{9:11}$-double bond, with a sulfonic acid and treating the 19-sulfonic acid ester obtained with a basic agent.

2. Process as claimed in claim 1, wherein the esterification of the 19-hydroxy-steroid is performed with a halide of a lower aliphatic sulfonic acid, in the presence of a tertiary organic base.

3. Process as claimed in claim 1, wherein the esterification of the 19-hydroxy-steroid is performed with a halide of a monocyclic aromatic sulfonic acid, in the presence of a tertiary organic base.

4. Process according to claim 1, wherein the esterification of the 19-hydroxy-steroid is performed with methane sulfonic acid chloride in the presence of pyridine.

5. Process according to claim 1, wherein there are used as starting steroids $\Delta^{9:11}$-19-hydroxysteroids, the esterification is carried out with a sulfonic acid halide in the presence of a base and the so formed $\Delta^{11:12}$-$9\beta$:19-cyclosteroids are isolated directly.

6. Process according to claim 1, wherein the 19-sulfonic acid esters are treated with a member selected from the group consisting of an alkali hydroxide, an alkali alcoholate and alkali carbonate.

7. Process for the manufacture of $9\beta$:19-cyclo-steroids, wherein $\Delta^{11:12}$-$9\beta$:19-cyclo-steroids are catalytically hydrogenated to yield the corresponding $9\beta$:19-cyclo-steroids saturated in 11:12-position.

8. Process for the manufacture of $9\beta$:19-cyclo-steroids wherein 11-oxo-$9\beta$:19-cyclo-steroids are treated with hydrazine and alkali to afford the $9\beta$:19-cyclo-steroids unsubstituted in 11-position.

9. A member selected from the group consisting of compounds of the formulae

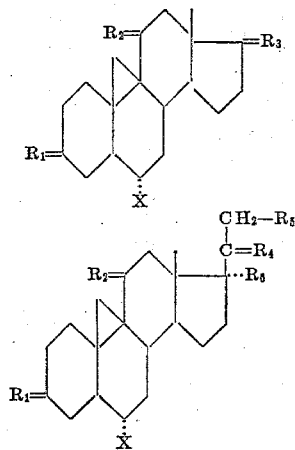

wherein $R_1$ stands for a member selected from the group consisting of oxo, lower alkylenedioxy, hydrogen together with hydroxy, hydrogen together with acyloxy, $R_2$ for a member selected from the group consisting of hydrogen and oxo, $R_3$ for a member selected from the group consisting of oxo, lower alkylenedioxy, hydrogen together with $\beta$-positioned hydroxyl and hydrogen together with $\beta$-positioned acyloxy, $\beta$-positioned hydroxyl together with a member selected from the group consisting of lower alkyl, lower alkenyl and lower alkinyl, and such groupings wherein the $\beta$-hydroxyl group is esterified, X is a member selected from the group consisting of hydrogen, methyl, fluorine and chlorine, $R_4$ is a member selected from the group consisting of oxo and lower alkylenedioxy, and $R_5$ and $R_6$ are a member selected from the group consisting of hydrogen, hydroxy and acyloxy, the dehydro compounds thereof which have a double bond extending from carbon atom 5, and the $\Delta^{11(12)}$-dehydro derivatives of all these compounds unsubstituted in the 11-position, the above mentioned esterified hydroxyl groups being derived from acids having from 1 to 20 carbon atoms.

10. 3:20-dioxo-$9\beta$:19-cyclo-$5\alpha$-pregnane.
11. The 3:20-bisethyleneglycol ketal of the compound of claim 10.
12. $\Delta^4$-3:20-dioxo-$9\beta$:19-cyclo-pregnene.
13. 3:11:20-trioxo-$9\beta$:19-cyclo-$5\alpha$-pregnane.
14. The 3:20-bisethyleneglycol ketal of the compound of claim 13.
15. $\Delta^4$-3:11:20-trioxo-$9\beta$:19-cyclo-pregnene.
16. $\Delta^{11}$-3:20-dioxo-$9\beta$:19-cyclo-$5\alpha$-pregnene.
17. The 3:20-bisethyleneglycol ketal of the compound of claim 16.
18. 3:17-dihydroxy-11-oxo-$9\beta$:19-cyclo-androstane.
19. $\Delta^4$-3:11-dioxo-17$\beta$-hydroxy-$9\beta$:19-cyclo-androstene.
20. $\Delta^{11}$-3:17$\beta$-dihydroxy-$9\beta$:19-cyclo-androstene.
21. 3:17-dihydroxy-$9\beta$:19-cyclo-androstane.
22. 3-hydroxy-11:20-dioxo-$9\beta$:19-cyclo-pregnane.
23. $\Delta^{11}$-3-hydroxy-20-oxo-$9\beta$:19-cyclo-pregnene.
24. 3:17-bisethylenedioxy-11-oxo-$9\beta$:19-cyclo-androstane.
25. $\Delta^{4:11}$-3:20-dioxo-$9\beta$:19-cyclo-pregnadiene.
26. $\Delta^{11}$-3:17$\beta$-dihydroxy-17$\alpha$-methyl-$9\beta$:19-cyclo-androstene.
27. $\Delta^{4:11}$-3-oxo-17$\beta$-hydroxy-17$\alpha$-methyl-$9\beta$:19-cyclo-androstadiene.

References Cited by the Examiner

Wehrli et al.: "Helv. Chim. Acta.," 44, 2162–73 (1961).

LEWIS GOTTS, *Primary Examiner.*